US012308516B2

(12) United States Patent
Choi et al.

(10) Patent No.: US 12,308,516 B2
(45) Date of Patent: May 20, 2025

(54) ANTENNA STACK STRUCTURE

(71) Applicant: DONGWOO FINE-CHEM CO., LTD., Jeollabuk-do (KR)

(72) Inventors: Byung Jin Choi, Incheon (KR); Dong Pil Park, Incheon (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 141 days.

(21) Appl. No.: 18/098,837

(22) Filed: Jan. 19, 2023

(65) Prior Publication Data

US 2023/0155279 A1 May 18, 2023

Related U.S. Application Data

(63) Continuation of application No. PCT/KR2021/009409, filed on Jul. 21, 2021.

(30) Foreign Application Priority Data

Jul. 24, 2020 (KR) ........................ 10-2020-0092535

(51) Int. Cl.
*H01Q 1/48* (2006.01)
*H01Q 1/24* (2006.01)
*H01Q 9/04* (2006.01)

(52) U.S. Cl.
CPC ............... *H01Q 1/48* (2013.01); *H01Q 1/243* (2013.01); *H01Q 9/0407* (2013.01)

(58) Field of Classification Search
CPC ........ H01Q 1/48; H01Q 1/243; H01Q 9/0407; H01Q 1/38; H01Q 1/44; H01Q 1/242;
(Continued)

(56) References Cited

U.S. PATENT DOCUMENTS 11,315,987 B2 * 4/2022 Nakamura ............ G06F 1/1698
2011/0237309 A1 * 9/2011 Shoji ........................ H01Q 9/42
343/893
(Continued)

FOREIGN PATENT DOCUMENTS

CN 110120995 A * 8/2019 ............... G09F 9/00
CN 111063993 A 4/2020
(Continued)

OTHER PUBLICATIONS

International Search Report for PCT/KR2021/009409 mailed on Nov. 4, 2021.
(Continued)

*Primary Examiner* — Hoang V Nguyen
*Assistant Examiner* — Brandon Sean Woods
(74) *Attorney, Agent, or Firm* — The PL Law Group, PLLC

(57) ABSTRACT

An antenna stack structure according to an embodiment includes an antenna substrate layer, an antenna unit disposed on a top surface of the antenna substrate layer, the antenna unit including a radiator and an antenna pad, and a display panel including a grounding element disposed on a bottom surface of the antenna substrate layer. The antenna pad is superimposed over the grounding element in a planar view. Signaling and radiation properties can be improved utilizing the antenna pad.

14 Claims, 4 Drawing Sheets

(58) Field of Classification Search

CPC ... H01Q 1/50; G02F 1/133528; H01L 27/124; H10K 50/841; H10K 50/86; H10K 59/00; H10K 59/131; H10K 59/179

USPC ........................................................ 343/702

See application file for complete search history.

(56) References Cited

U.S. PATENT DOCUMENTS

| | | | | |
|---|---|---|---|---|
| 2016/0190678 | A1* | 6/2016 | Hong | H01Q 1/364<br>343/700 MS |
| 2018/0188432 | A1* | 7/2018 | Choi | G02B 5/3033 |
| 2019/0097312 | A1* | 3/2019 | Ng | H01Q 1/44 |
| 2022/0183153 | A1* | 6/2022 | Johnston | H01Q 1/38 |

FOREIGN PATENT DOCUMENTS

| | | | | | |
|---|---|---|---|---|---|
| CN | 111293410 | A | | 6/2020 | |
| CN | 215869776 | U | | 2/2022 | |
| JP | 2009020140 | A | * | 1/2009 | |
| JP | 2018-142872 | A | | 9/2018 | |
| KR | 10-2013-0113222 | A | | 10/2013 | |
| KR | 10-2016-0080444 | A | | 7/2016 | |
| KR | 10-2089458 | B1 | | 3/2020 | |
| KR | 10-2020-0039311 | A | | 4/2020 | |
| KR | 10-2020-0043124 | A | | 4/2020 | |
| KR | 10-2204410 | B1 | | 1/2021 | |
| WO | WO-2015133454 | A1 | * | 9/2015 | H01P 5/107 |
| WO | WO-2019235860 | A1 | * | 12/2019 | H01Q 1/24 |

OTHER PUBLICATIONS

Office action issued on Sep. 15, 2020 from Korean Patent Office in a counterpart Korean Patent Application No. 10-2020-0092535 (all the cited references are listed in this IDS.) (English translation is also submitted herewith.).

Office action issued on Dec. 14, 2024 from China Patent Office in a counterpart China Patent Application No. 202110815250.0 (all the cited references are listed in this IDS.) (English translation is also submitted herewith.).

* cited by examiner

ANTENNA STACK STRUCTURE

CROSS-REFERENCE TO RELATED APPLICATION AND CLAIM OF PRIORITY

This application is a continuation application to International Application No. PCT/KR2021/009409 with an International Filing Date of Jul. 21, 2021, which claims the benefit of Korean Patent Application No. 10-2020-0092535 filed on Jul. 24, 2020 at the Korean Intellectual Property Office (KIPO), the entire disclosures of which are incorporated by reference herein.

BACKGROUND

1. Field

The present invention relates to an antenna stack structure. More particularly, the present invention relates to an antenna stack structure including an antenna layer and a ground layer.

2. Description of the Related Art

As mobile communication technologies have been developed, an antenna for implementing a communication of high frequency or ultra-high frequency band is applied to a display device such as a smartphone, various objects or structures such as a vehicle, an architecture, etc.

An optical structure such as a polarizing plate and various sensor structures may be included in the display device. Accordingly, when the antenna is included in the display device, proper arrangement and construction of the antenna to avoid an interference between the optical structure and the sensor structure is needed.

Additionally, a space to which the antenna can be applied may be limited by the optical structure and the sensor structure. If an additional film or structure is formed for inserting the antenna, an overall thickness and volume of the display device may be increased.

Thus, an antenna construction to obtain sufficient radiation and gain properties of the antenna in a limited space is required.

For example, Korean Published Patent Application No. 10-2013-0113222 discloses an antenna structure embedded in a portable terminal, but does not sufficiently disclose an antenna design in consideration of both optical and radiation properties in the display device as described above.

SUMMARY

According to an aspect of the present invention, there is provided an antenna stack structure having improved radiation property.

(1) An antenna stack structure, including: an antenna substrate layer; an antenna unit disposed on a top surface of the antenna substrate layer, the antenna unit including a radiator and an antenna pad; and a display panel including a grounding element disposed on a bottom surface of the antenna substrate layer, wherein the antenna pad is superimposed over the grounding element in a planar view.

(2) The antenna stack structure of the above (1), wherein the display panel has a display area and a non-display area, and the grounding element is disposed in the non-display area.

(3) The antenna stack structure of the above (2), wherein the display panel includes a TFT electrode and a display device disposed in the display area.

(4) The antenna stack structure of the above (3), wherein the TFT electrode of the display panel includes an extension portion extending to the non-display area, and the extension portion of the TFT electrode serves as the grounding element.

(5) The antenna stack structure of the above (3), wherein the display panel further includes a bus bar connected to the TFT electrode and disposed in the non-display area, and the bus bar serves as the grounding element.

(6) The antenna stack structure of the above (3), wherein the display panel includes a grounding structure formed at the same layer as that of the display device in the non-display area, and the grounding structure serves as the grounding element.

(7) The antenna stack structure of the above (3), wherein the display device serves as a ground of the antenna unit.

(8) The antenna stack structure of the above (1), wherein the antenna substrate layer includes glass or an optical film.

(9) The antenna stack structure of the above (8), wherein the optical film includes a polarizing plate.

(10) The antenna stack structure of the above (1), further including a cover window disposed on a top surface of the antenna unit.

(11) The antenna stack structure of the above (10), further including a polarizing plate interposed between the cover window and the antenna unit.

(12) The antenna stack structure of the above (1), further including a touch sensing structure disposed on a top surface of the display panel.

(13) The antenna stack structure of the above (1), wherein the antenna pad includes a signal pad connected to the radiator and a ground pad formed around the signal pad.

(14) The antenna stack structure of the above (1), wherein the radiator has a mesh structure.

(15) The antenna stack structure of the above (14), wherein the antenna unit further includes a dummy mesh pattern arranged around the radiator.

An antenna stack structure according to embodiments of the present invention may include a display panel including a grounding element overlapping an antenna pad in a planar view. The antenna pad may be utilized for matching a resonance frequency and optimizing an impedance so that gain and radiation properties of an antenna may be improved.

In some embodiments, an electrode layer of the display panel may serve as a radiation ground, and the antenna stack structure integrated with the display panel may be provided.

DETAILED DESCRIPTION OF THE EMBODIMENTS

According to exemplary embodiments of the present invention, there is provided an antenna stack structure in which a pad of an antenna unit and a grounding element of a display panel may overlap each other in a planar view.

The antenna stack structure may include, e.g., a microstrip patch antenna fabricated in the form of a transparent film. The antenna stack structure may be applied to communication devices for a mobile communication of a high or ultrahigh frequency band corresponding to a mobile communication of, e.g., 3G, 4G, 5G or more, Wi-fi, Bluetooth, NFC, GPS, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
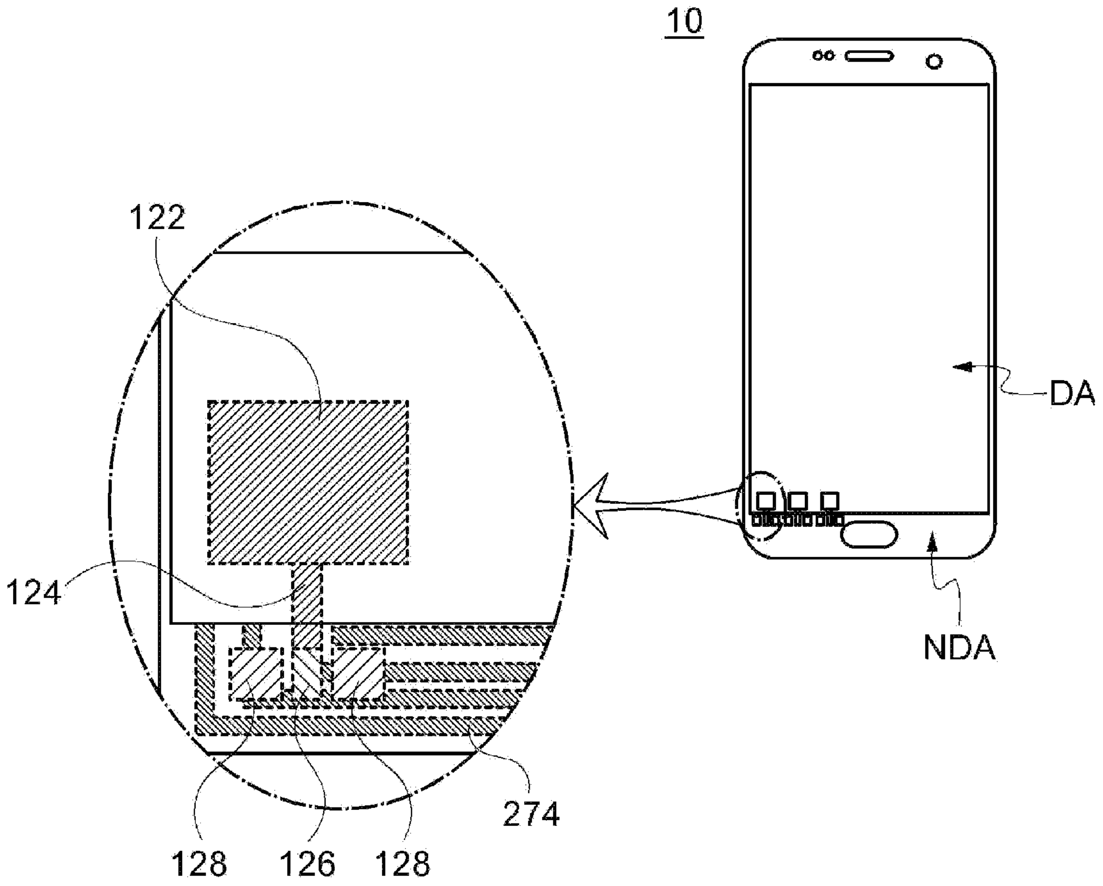
FIG. 1 is a schematic top planar view illustrating an antenna stack structure in accordance with exemplary embodiments.
Figure 2:
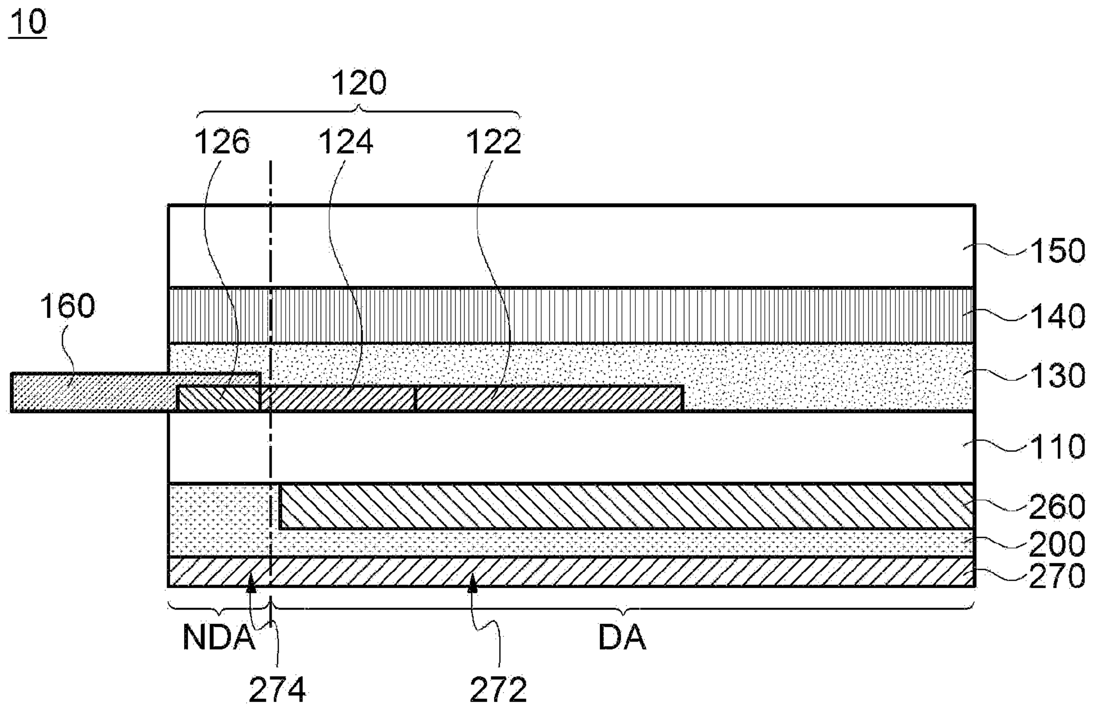
FIG. 2 is a schematic cross-sectional view illustrating an antenna stack structure in accordance with exemplary embodiments.

FIG. 1 is a schematic top planar view illustrating an antenna stack structure in accordance with exemplary embodiments. FIG. 2 is a schematic cross-sectional view illustrating an antenna stack structure in accordance with exemplary embodiments. FIG. 2 illustrates only one antenna unit, but a plurality of the antenna units may be arranged on an antenna substrate layer 110 in an array form.

Referring to FIGS. 1 and 2, an antenna stack structure 10 may include the antenna substrate layer 110, an antenna unit 120 and a display panel 200.

The antenna substrate layer 110 may be disposed between the antenna unit 120 and the display panel 200 to serve as a dielectric layer of an antenna.

The antenna substrate layer 110 may include, e.g., a transparent resin material. For example, the antenna substrate layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA) or an optically clear resin (OCR) may be included in the antenna substrate layer 110.

In some embodiments, the antenna substrate layer 110 may include an inorganic insulating material such as silicon oxide, silicon nitride, silicon oxynitride, glass, or the like.

In an embodiment, the antenna substrate layer 110 may be provided as a substantially single layer. In an embodiment, the antenna substrate layer 110 may include a multi-layered structure of at least two layers.

A capacitance or an inductance may be formed between the antenna unit 120, and a grounding element included in the display panel 200, so that a frequency band at which the antenna stack structure 10 may be operated may be adjusted.

In some embodiments, a dielectric constant of the antenna substrate layer 110 may be adjusted in a range from about 1.5 to about 12. When the dielectric constant exceeds about 12, a driving frequency may be excessively decreased, so that driving in a desired high or ultra-high frequency band may not be implemented. For example, if the antenna substrate layer 110 includes glass, the antenna substrate layer 110 may have a dielectric constant from 3.5 to 8.

A cover window 150 may be disposed on the antenna unit 120. The cover window 150 may be disposed on an opposite side from the antenna substrate layer 110. The cover window 150 may be disposed on a viewing surface or an outermost surface of the antenna stack structure 10.

The cover window 150 may include, e.g., glass or a flexible resin material such as polyimide, polyethylene terephthalate (PET), an acrylic resin, a siloxane-based resin, etc.

In some embodiments, a thickness of the cover window 150 may be from about 10 μm to 1,000 μm. Preferably, the thickness of the cover window 150 may be from about 300 μm to 700 μm if the cover window is formed of a flexible resin material, and may be from 10 μm to 100 μm if the cover window is formed of a thin glass.

In some embodiments, an upper surface of the antenna unit 120 may directly contact the cover window 150.

In some embodiments, an insulating layer 130 may be disposed on the antenna unit 120. The insulating layer 130 may cover an upper surface of the antenna unit 120. The insulating layer 130 may passivate and planarize the upper surface of the antenna unit 120, and may serve as a supporting layer for a polarizing layer 140 and the cover window 150.

In exemplary embodiments, the insulating layer 130 may include at least one of an organic insulating layer and an inorganic insulating layer.

The organic insulating layer may include polyacrylate, polymethacrylate (e.g., PMMA), polyimide, polyamide, polyvinyl alcohol, polyamic acid, polyolefin (e.g., PE, PP), polystyrene, polynorbornene, phenylmaleimide copolymer, polyazobenzene, polyphenylenephthalamide, polyester (e.g., PET, PBT), polyarylate, a cinnamate-based polymer, a coumarin-based polymer, a phthalimidine-based polymer, a chalcone-based polymer, an aromatic acetylene-based polymer, etc. These may be used alone or in a combination thereof.

For example, the organic insulating layer may be formed by coating and drying a composition including the above-mentioned polymer material. A thickness of the organic insulating layer may be from about 1 μm to 5 μm, preferably from about 1.5 μm to 2.5 μm.

The inorganic insulating layer may include a single layer or a multi-layered structure, and may be formed of a metal oxide or a metal nitride. For example, the inorganic insulating layer may include at least one of $SiN_x$, SiON, $Al_2O_3$, $SiO_2$ and $TiO_2$.

For example, the inorganic insulating layer may be formed as a SiON layer or a $SiO_2$ layer, or a bilayer of SiON and $SiO_2$ layers.

For example, the inorganic insulating layer may be formed by a deposition process such as chemical vapor deposition (CVD) process. The inorganic insulating layer may have a thickness from about 100 nm to 1,000 nm, preferably about 200 nm to 400 nm.

In exemplary embodiments, the insulating layer 130 may further include an adhesive layer. The adhesive layer may include a pressure-sensitive adhesive (PSA), an optically clear adhesive (OCA) or an optically clear resin (OCR) including an acrylic resin, a silicone-based resin, an epoxy-based resin, etc. For example, the organic/inorganic insulating layer may be bonded to the polarizing layer 140 or the cover window 150 through the adhesive layer.

In exemplary embodiments, a thickness of the adhesive layer may be from about 25 to 300 μm.

In exemplary embodiments, the polarizing layer 140 may be disposed on the upper surface of the antenna unit 120. For example, the polarizing layer 140 may be disposed between the insulating layer 130 and the cover window 150. The polarizing layer 140 may be bonded to the insulating layer 130 by the adhesive layer. An additional adhesive layer may be formed on the polarizing layer 140. In this case, the polarizing layer 140 and the cover window 150 may be bonded to each other by the additional adhesive layer.

The polarizing layer 140 may include a coating-type polarizer or a polarizing plate. The coating-type polarizer may include a liquid crystal coating layer including a polymerizable liquid crystal compound and a dichroic dye. In this case, the polarizing layer may further include an alignment layer for providing an orientation to the liquid crystal coating layer.

For example, the polarizing layer 140 may include a polyvinyl alcohol-based polarizer and a protective film attached to at least one surface of the polyvinyl alcohol-based polarizer.

For example, the protective film may include a polymer film such as COP-based, TAC-based, acryl-based or PET-based film.

Figure 3:
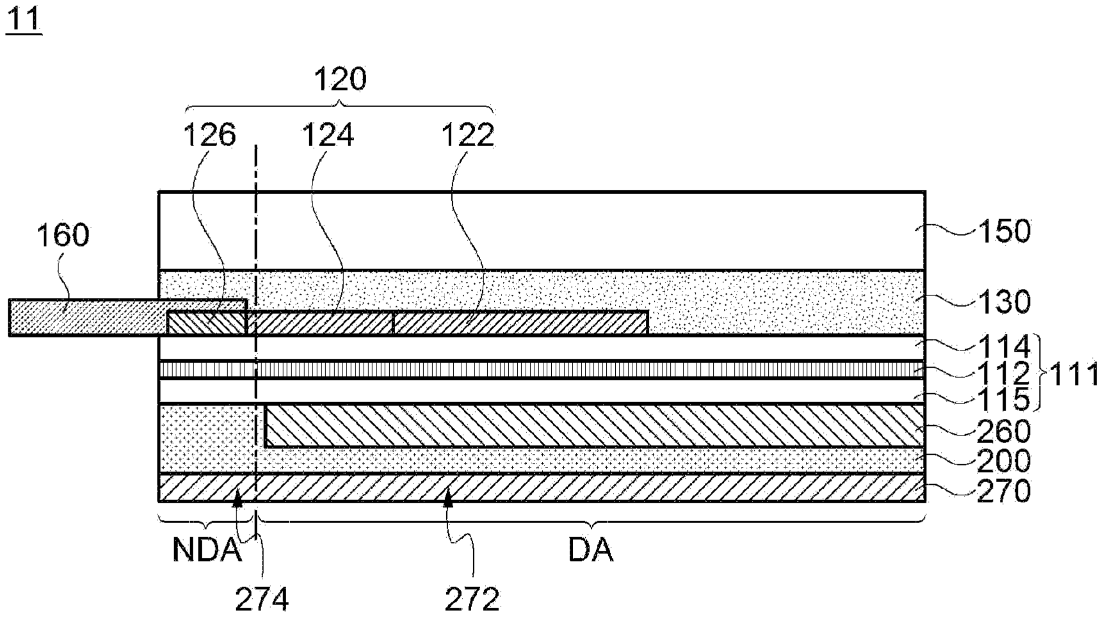
FIG. 3 is a schematic cross-sectional view illustrating an antenna stack structure in accordance with exemplary embodiments.

FIG. 3 is a schematic cross-sectional view illustrating an antenna stack structure in accordance with exemplary embodiments. Detailed descriptions on elements and structure substantially the same as or similar to those described with reference to FIG. 2 may be omitted.

Referring to FIG. 3, the antenna substrate layer 110 of an antenna stack structure 11 may include an optical film.

In some embodiments, the optical film may include a polarizing plate 111. For example, the optical film may include a laminate of a polarizer 112 and polarizer protective films 114 and 115 formed on at least one surface of the polarizer 112. The polarizer 112 and the polarizer protective films 114 and 115 may be bonded by, e.g., an adhesive layer.

In exemplary embodiments, when the optical film includes the polarizing plate, the polarizing layer 140 may not be interposed between the antenna unit 120 and the cover window 150.

In an embodiment, a blackened layer may be formed on a viewing side of the antenna unit 120. In this case, visual recognition of an electrode may be prevented by the blackened layer.

In exemplary embodiments, a thickness of the antenna substrate layer 110 may be from 5 μm to 600 μm. If the antenna substrate layer 110 includes the polarizer 112, a thickness of the polarizer 112 may be from 50 μm to 200 μm. In this case, gain and efficiency of the antenna may be increased.

The antenna unit 120 may be disposed on one surface (e.g., a top surface) of the antenna substrate layer 110. For example, the antenna unit 120 may be directly formed on the top surface of the antenna substrate layer 110.

The antenna unit 120 may include a radiator 122, a transmission line 124 and/or an antenna pad.

For example, the antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

For example, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), tin oxide (SnOx), zinc oxide (ZnOx), indium zinc tin oxide (IZTO), etc.

In some embodiments, the antenna unit 120 may include a stacked structure of a transparent conductive oxide layer and a metal layer. For example, the antenna unit 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, a thickness of the antenna unit 120 may be about 5,000 Å or less, preferably from about 1,000 Å to 5,000 Å. Within this range, a color shift phenomenon from a viewing surface of the antenna stack structure may be suppressed while preventing an increase in resistance of the antenna unit 120.

The radiator 122 may have, e.g., a polygonal plate shape, and the transmission line 124 may extend from one side of the radiator 122 to be electrically connected to the signal pad 126. The transmission line 124 may be formed as a single member substantially integral with the radiator 122.

In some embodiments, the antenna pad may include a signal pad 126 and may further include a ground pad 128. For example, a pair of the ground pads 128 may be disposed with the signal pad 126 interposed therebetween. The ground pads 128 may be electrically separated from the signal pad 126 and the transmission line 124.

In an embodiment, the ground pad 128 may be omitted. The signal pad 126 may be formed as an integral member at an end portion of the transmission line 124.

In some embodiments, an end portion of the antenna unit 120 may be electrically connected to a circuit connection structure. The circuit connection structure may include, e.g., a flexible printed circuit board (FPCB).

The antenna pad may be electrically connected to an antenna driving integrated circuit (IC) chip through the circuit connection structure such as the flexible printed circuit board. Accordingly, a feeding and a driving control to the antenna unit may be performed by the antenna driving IC chip.

The driving IC chip may be directly disposed on the flexible circuit board. For example, the flexible circuit board (FPCB) may further include a circuit or a contact electrically connecting the driving IC chip and the antenna unit. The flexible circuit board (FPCB) and the driving IC chip may be disposed to be adjacent to each other, so that a signal transmission/reception path may be shortened and a signal loss may be suppressed.

In an embodiment, the antenna unit 120 may be formed as a mesh structure. For example, the antenna unit 120 may be directly formed on the top surface of the antenna substrate layer 110 by a sputtering process.

In exemplary embodiments, the radiator 122 may have a mesh structure. In some embodiments, the transmission line 124 connected to the radiator 122 may also have a mesh structure.

The radiator 122 may include the mesh structure, so that transmittance may be improved even when the radiator 122 is disposed in a display area of a display device, thereby preventing electrodes from being visually recognized and preventing an image quality from being deteriorated.

A dummy mesh pattern may be disposed around the radiator 122 and the transmission line 124. The dummy mesh pattern may be electrically and physically spaced apart from the radiator 122 and the transmission line 124 by a separation region.

For example, a conductive layer including the above-described metal or alloy may be formed on the antenna substrate layer 110. The conductive layer may be partially etched along a profile of the radiator 122 and the transmission line 124 to form a separation region while forming the mesh structure. Accordingly, the antenna unit 120 and the dummy mesh pattern isolated by the separation region may be formed on the antenna substrate layer 110.

In some embodiments, the signal pad 126 may be formed as a solid structure to reduce a feeding resistance. For example, the signal pad 126 may be disposed in a non-display area or a light-shielding area of the display device to be bonded or connected to a flexible circuit board and/or an antenna driving IC chip.

Accordingly, the signal pad 126 may be disposed at an outside of a user's viewing area or a display area DA. In an embodiment, the signal pad 126 may substantially consist of a metal or alloy.

The display panel 200 may be formed on an opposite surface with respect to the antenna unit 120 of the antenna substrate layer 110 (e.g., a bottom surface of the antenna substrate layer 110).

The display panel 200 may include a liquid crystal display device, an organic LED display device, an inorganic LED display device, a plasma display device, etc., and may be preferably a self-luminous display device such as the organic LED display device or the inorganic LED display device.

Figure 4:
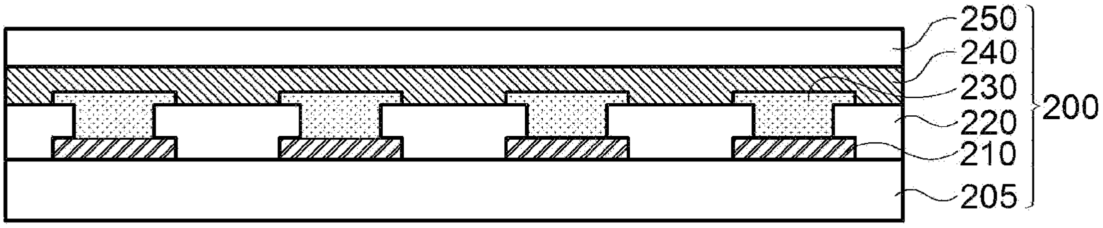
FIG. 4 is a schematic cross-sectional view illustrating a display panel in accordance with exemplary embodiments.

FIG. 4 is a schematic cross-sectional view illustrating a display panel in accordance with exemplary embodiments.

Referring to FIG. 4, the display panel 200 may include a panel substrate 205, a display device and an encapsulation layer 250 covering the display device. The display device may include an electrode layer, a pixel defining layer 220 and a display layer 230. The electrode layer may include a pixel electrode 210 and an opposing electrode 240.

The display device and the encapsulation layer 250 may be sequentially formed on the panel substrate 205.

A pixel circuit including a thin film transistor (TFT) electrode 270 may be formed on the panel substrate 205, and an insulating layer covering the pixel circuit may be formed. The pixel electrode 210 may be electrically connected to, e.g., a drain electrode of the TFT on the insulating layer.

The pixel defining layer 220 may be formed on the insulating layer to expose the pixel electrode 210 to define a pixel area. The display layer 230 may be formed on the pixel electrode 210, and the display layer 230 may include, e.g., a liquid crystal layer or an organic light emitting layer. Preferably, the display layer 230 may include the organic light emitting layer, and the display panel 200 may be an OLED panel.

The opposing electrode 240 may be disposed on the pixel defining layer 220 and the display layer 230. The opposing electrode 240 may serve as, e.g., a common electrode or a cathode of the display panel 200. The encapsulation layer 250 for protecting the display panel 200 may be stacked on the opposing electrode 240.

In exemplary embodiments, a display device 260 of the display panel 200 may overlap the radiator 122 of the antenna unit 120 in a thickness direction of the antenna stack structure 10. In this case, the opposing electrode 240 may serve as a ground of the radiator 122.

In exemplary embodiments, the encapsulation layer 250 may serve as the antenna substrate layer 110. In this case, the display panel 200 and the antenna stack structure 10 may be integrated to provide a thin film structure.

The display panel 200 may include a grounding element overlapping the antenna pad of the antenna unit 120 in a planar view of the antenna stack structure 10.

The grounding element may be coupled to the antenna pad to form an inductance or a capacitance. Thus, a resonance frequency and an impedance of the antenna may be adjusted by using the antenna pad. Accordingly, gain and radiation property of the antenna may be improved.

The display panel 200 may include a display area DA in which an image is displayed and a non-display area NDA around the display area DA. For example, a display device 260 and the TFT electrode 270 may be disposed in the display area DA. The grounding element may be formed in the non-display area NDA.

Referring to FIGS. 2 and 3, the grounding element may include the TFT electrode 270.

In exemplary embodiments, the TFT electrode 270 may extend beyond the display area DA to the non-display area NDA. In this case, a portion located in the display area DA may be defined as a display portion 272, and a portion extending to the non-display area NDA may be defined as an extension portion 274.

Accordingly, as illustrated in FIG. 1, the antenna pad 126 and 128 may be superimposed over the extension portion 274 in a planar view, and the extension portion 274 may serve as the grounding element.

In exemplary embodiments, the extension portion 274 may include a conductive wiring of the TFT electrode 270, a trace connected to the TFT electrode 270 or a bus bar (not illustrated) connected to the TFT electrode 270.

For example, the TFT electrode 270, the trace and the bus bar may be formed of a low-resistance metal, without, e.g., considering transparency, such as silver (Ag), gold (Au), copper (Cu), Aluminum (Al), platinum (Pt), palladium (Pd), chromium (Cr), titanium (Ti), tungsten (W), niobium (Nb), tantalum (Ta), vanadium (V), iron (Fe), Manganese (Mn), cobalt (Co), nickel (Ni), zinc (Zn), tin (Sn), molybdenum (Mo), calcium (Ca) or an alloy containing at least one of the metals. Preferably, the low-resistance metal may include copper, aluminum, a silver-palladium-copper alloy or a copper-calcium alloy. In this case, the frequency and impedance of the antenna may be effectively adjusted and matched.

Figure 5:
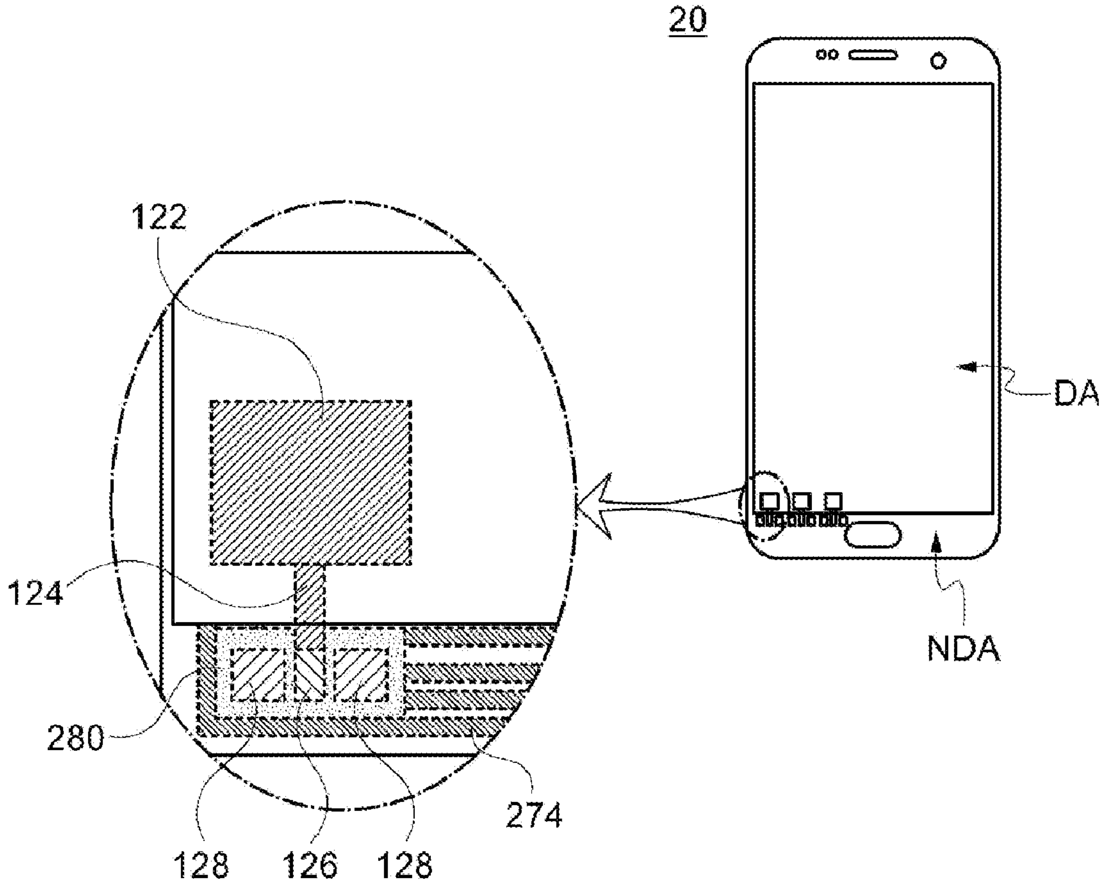
FIG. 5 is a schematic top planar view illustrating an antenna stack structure in accordance with exemplary embodiments.
Figure 6:
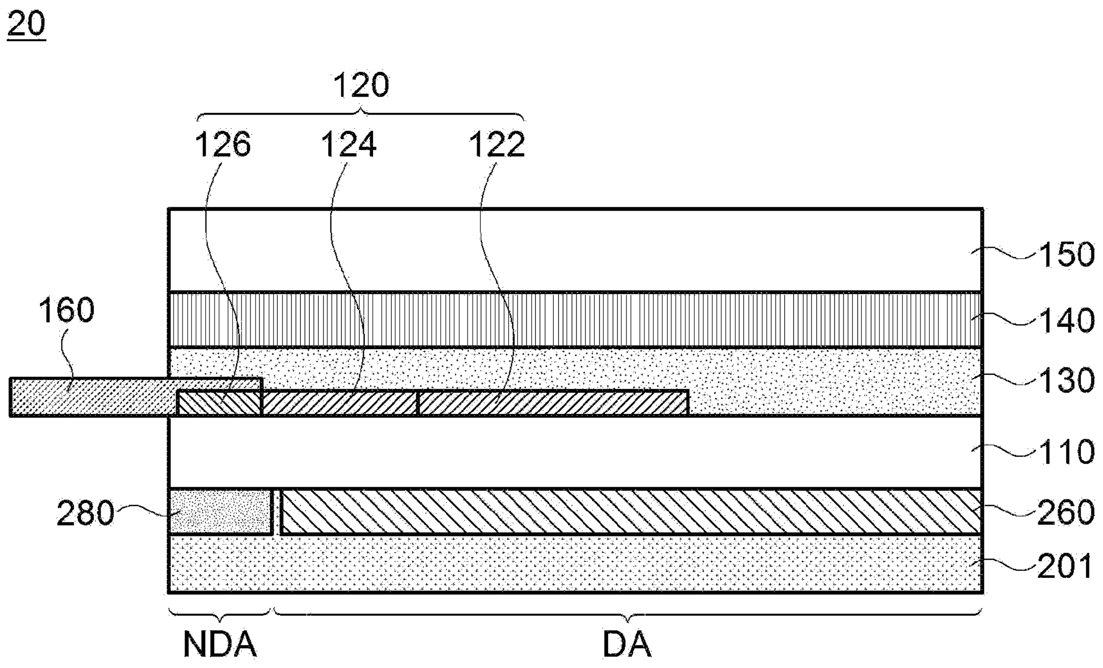
FIG. 6 is a schematic cross-sectional view illustrating an antenna stack structure in accordance with exemplary embodiments.

FIG. 5 is a schematic top planar view illustrating an antenna stack structure in accordance with exemplary embodiments. FIG. 6 is a schematic cross-sectional view illustrating an antenna stack structure in accordance with exemplary embodiments. Detailed descriptions on elements and structure substantially the same as or similar to those described with reference to FIGS. 1 to 4 may be omitted.

Referring to FIGS. 5 and 6, a display panel 201 of an antenna stack structure 20 may include a grounding structure 280. The grounding structure 280 may be formed at the same layer or at the same level as that of the display device 260.

In exemplary embodiments, the grounding structure 280 may be formed in the non-display area NDA. Accordingly, the antenna pad 126 and 128 of the antenna unit 120 disposed in the non-display area NDA may be superimposed over the grounding structure. In this case, the grounding structure 280 may be coupled to the antenna pad 126 and 128 as the grounding element, and the frequency and impedance of the antenna may be effectively adjusted.

For example, the grounding structure 280 may include the same material as that mentioned above in the TFT electrode 270 as an example, and may be formed in a rod or plate shape. In some embodiments, the grounding structure 280 may include a mesh structure or a solid structure.

In some embodiments, the grounding structure 280 may be formed of the same material as that of the TFT electrode 270, and the extension portion 274 of the TFT electrode 270, the grounding structure 280 and the antenna pad of the antenna unit 120 may be sequentially stacked to overlap each other. In this case, the extension portion 274 of the TFT electrode 270, the grounding structure 280 and the antenna unit 120 may be coupled together to improve the gain of the antenna.

In exemplary embodiments, the grounding structure 280 may be electrically connected to the ground pad 128 of the antenna unit 120. For example, the grounding structure 280 and the ground pad 128 of the antenna unit 120 may be connected through a via or a contact penetrating the antenna substrate layer 110. In some embodiments, the grounding structure 280 may be electrically connected to the ground pad 128 of the antenna unit 120 through a ground wiring bypassing a lateral side of the antenna substrate layer 110. In this case, the gain of the antenna may be improved.

In exemplary embodiments, the grounding structure 280 may be disposed on an opposite surface (e.g., the bottom surface) with respect of the antenna unit 120 of the antenna substrate layer 110. For example, the grounding structure 280 may be disposed under the antenna pads 126 and 128. In this case, the grounding structure 280 and the display device 260 may be electrically and physically separated.

In exemplary embodiments, the display device 260 may overlap the radiator 122 of the antenna unit 120 in a thickness direction of the antenna stack structure 10. In this case, the radiator 122 and the entire antenna pad may be utilized to adjust the resonance frequency and impedance of the antenna.

In some embodiments, the display device 260 may be formed only in the display area DA and may not overlap the antenna pad. In an embodiment, the display device 260 may overlap an entire area of the antenna unit 120.

In exemplary embodiments, the antenna stack structure 10 may further include a touch sensing structure. The touch sensing structure may be disposed at any area on an upper surface of the display panel 200.

In some embodiments, the touch sensing structure may be formed at an inside of the antenna unit 120. For example, the touch sensing structure may be formed at the same layer as that of the antenna unit.

In some embodiments, the touch sensing structure may be formed at an inside of the antenna substrate layer 110. For example, if the antenna substrate layer 110 includes the polarizing plate 111, the touch sensing structure may be embedded in the polarizer protective films 114 and 115.

The touch sensing structure may include, e.g., capacitive sensing electrodes. For example, column direction sensing electrodes and row direction sensing electrodes may be arranged to cross each other. The touch sensing structure may further include traces connecting the sensing electrodes and the driving IC chip to each other. The touch sensing structure may further include a substrate on which the sensing electrodes and the traces are formed.

What is claimed is:

1. An antenna stack structure comprising:

an antenna substrate layer;

an antenna unit disposed on a top surface of the antenna substrate layer, the antenna unit comprising a radiator and an antenna pad comprising a signal pad connected to the radiator and a ground pad formed around the signal pad; and a display panel including a grounding element disposed on a bottom surface of the antenna substrate layer, wherein the antenna pad is superimposed over the grounding element in a planar view, and the radiator is not superimposed over the grounding element in the planar view.

2. The antenna stack structure of claim 1, wherein the display panel has a display area and a non-display area, and the grounding element is disposed in the non-display area.

3. The antenna stack structure of claim 2, wherein the display panel further comprises a thin film transistor (TFT) electrode and a display device disposed in the display area.

4. The antenna stack structure of claim 3, wherein the TFT electrode of the display panel includes an extension portion extending to the non-display area, and the extension portion of the TFT electrode serves as the grounding element.

5. The antenna stack structure of claim 3, wherein the display panel further comprises a bus bar connected to the TFT electrode and disposed in the non-display area, and the bus bar serves as the grounding element.

6. The antenna stack structure of claim 3, wherein the display panel comprises a grounding structure formed at the same layer as that of the display device in the non-display area, and the grounding structure serves as the grounding element.

7. The antenna stack structure of claim 3, wherein the display device serves as a ground of the antenna unit.

8. The antenna stack structure of claim 1, wherein the antenna substrate layer comprises glass or an optical film.

9. The antenna stack structure of claim 1, wherein the antenna substrate layer comprises an optical film, and the optical film comprises a polarizing plate.

10. The antenna stack structure of claim 1, further comprising a cover window disposed on a top surface of the antenna unit.

11. The antenna stack structure of claim 10, further comprising a polarizing plate interposed between the cover window and the antenna unit.

12. The antenna stack structure of claim 1, further comprising a touch sensing structure disposed on a top surface of the display panel.

13. The antenna stack structure of claim 1, wherein the radiator has a mesh structure.

14. The antenna stack structure of claim 13, wherein the antenna unit further comprises a dummy mesh pattern arranged around the radiator.

* * * * *